Figure 1:
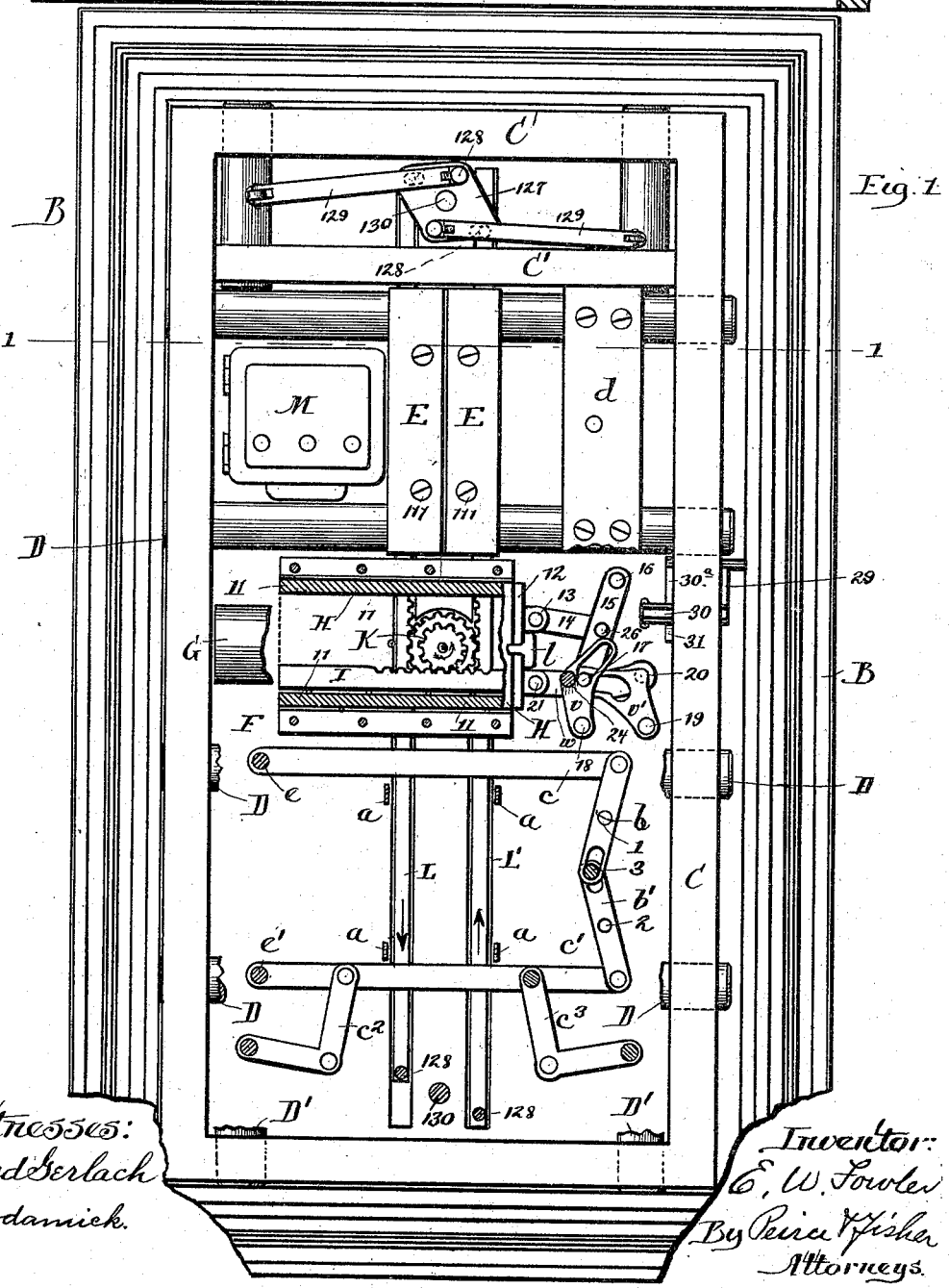

(No Model.)  10 Sheets—Sheet 1.

E. W. FOWLER.
BOLT WORK FOR SAFES.

No. 526,181. Patented Sept. 18, 1894.

Witnesses:
Fred Gerlach
A. Adamick

Inventor:
E. W. Fowler
By Peirce & Fisher
Attorneys (No Model.) 10 Sheets—Sheet 2.

E. W. FOWLER.
BOLT WORK FOR SAFES.

No. 526,181. Patented Sept. 18, 1894.

(No Model.)  10 Sheets—Sheet 4.
E. W. FOWLER.
BOLT WORK FOR SAFES.
No. 526,181.  Patented Sept. 18, 1894.
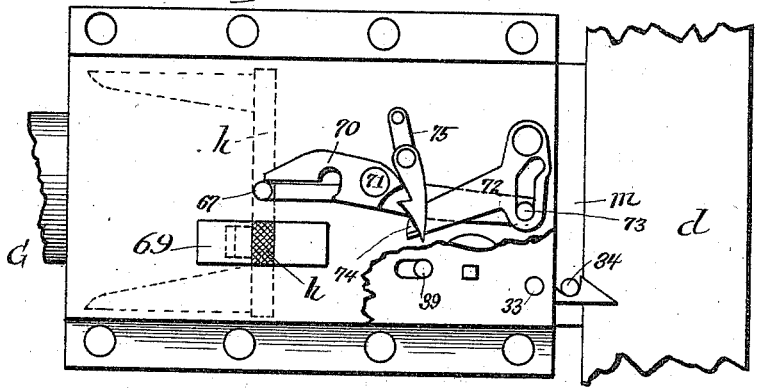
*Fig. 4.*
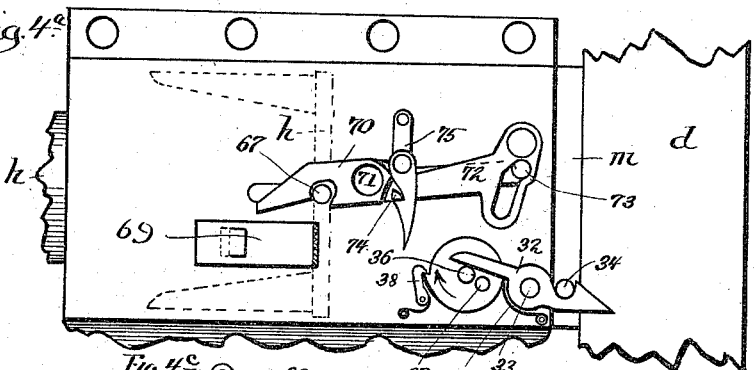
*Fig. 4ª.*
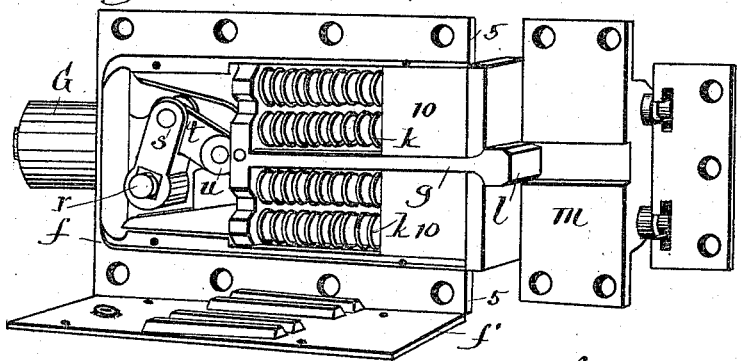
*Fig. 4ᵇ.*
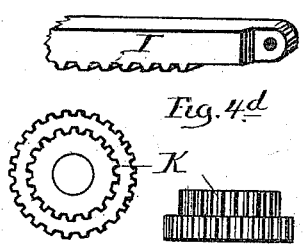
*Fig. 4ᶜ.*
*Fig. 4ᵈ.*
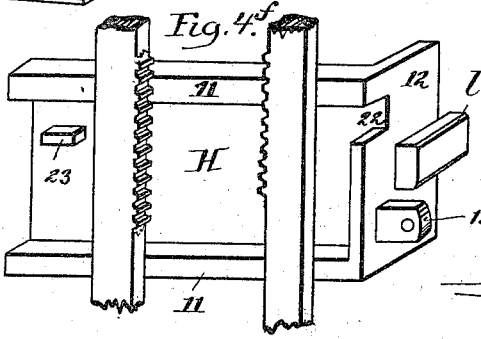
*Fig. 4ᶠ.*
Witnesses:
Fred Gerlach
A. Adamick.
Inventor:
E. W. Fowler
By Peirce & Fisher
Attorneys.

(No Model.) 10 Sheets—Sheet 5.
E. W. FOWLER.
BOLT WORK FOR SAFES.
No. 526,181. Patented Sept. 18, 1894.
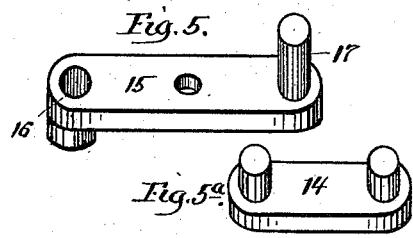
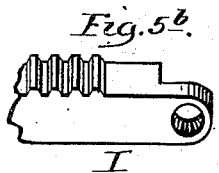
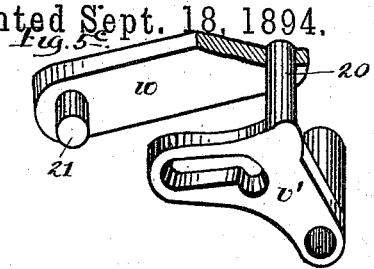
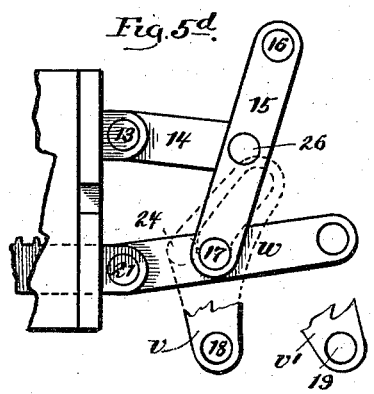
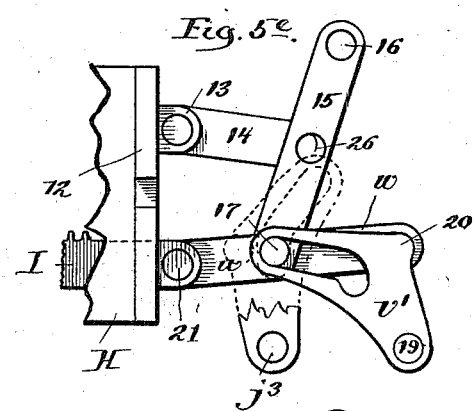
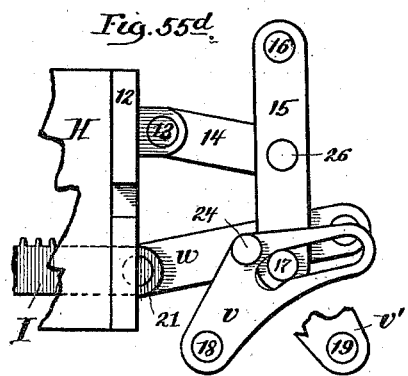
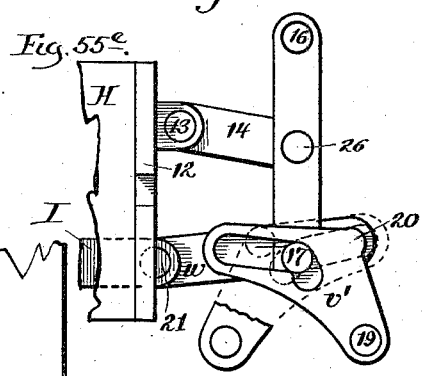
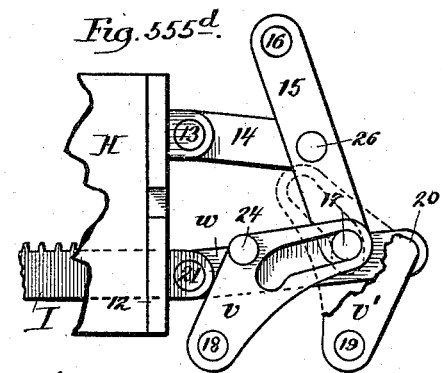
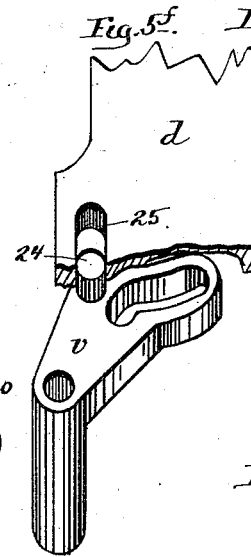
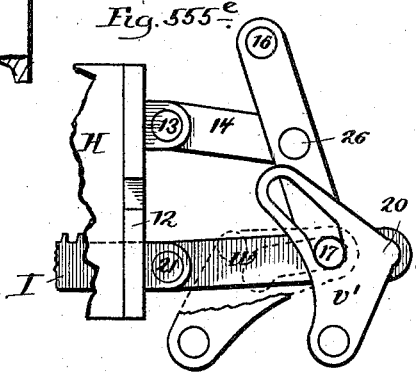
Witnesses:
Fred Gerlach
A. Adamick
Inventor:
E. W. Fowler
By Pierce & Fisher
Attorneys.

(No Model.) 10 Sheets—Sheet 6.

E. W. FOWLER.
BOLT WORK FOR SAFES.

No. 526,181. Patented Sept. 18, 1894.

Fig. 6ª.

Witnesses:
A. Adamick.
Fred Gerlach.

Inventor:
E. W. Fowler
By Peirce & Fisher
Attorneys.

(No Model.) 10 Sheets—Sheet 7.

E. W. FOWLER.
BOLT WORK FOR SAFES.

No. 526,181. Patented Sept. 18, 1894.

Witnesses:
Fred Gerlach
A. Adamick

Inventor:
E. W. Fowler
By Peirce & Fisher
Attorneys.

(No Model.)
E. W. FOWLER.
BOLT WORK FOR SAFES.
No. 526,181.  Patented Sept. 18, 1894.
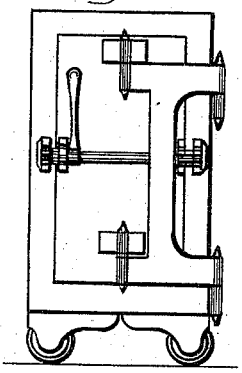
Fig. 10.
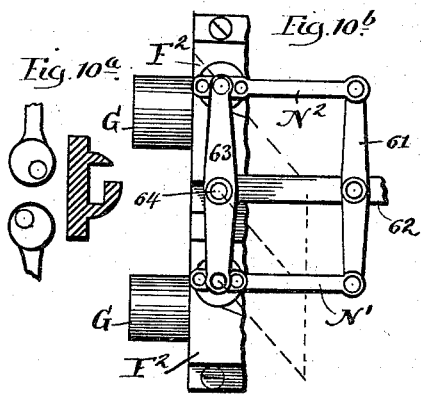
Fig. 10ᵃ. Fig. 10ᵇ.
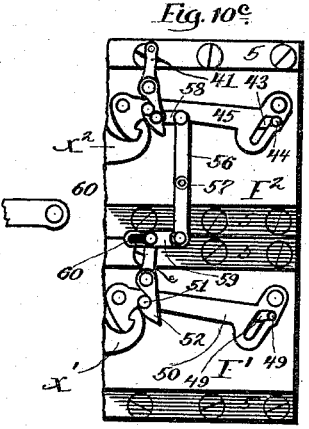
Fig. 10ᶜ.
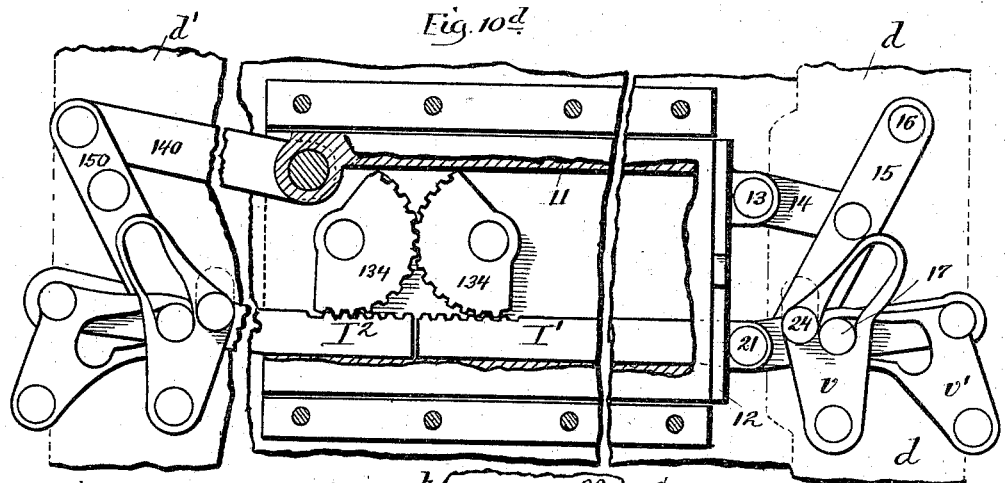
Fig. 10ᵈ.
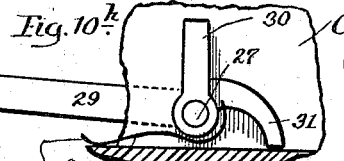
Fig. 10ⁱ. Fig. 10ʰ.
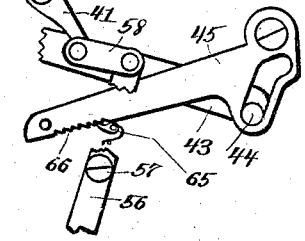
Fig. 10ᵉ.
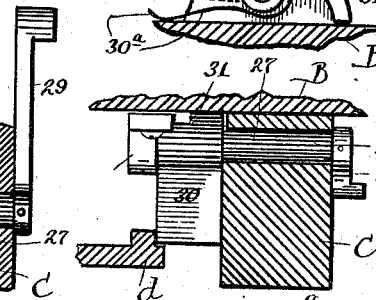
Fig. 10ᶠ. Fig. 10ᵍ.
Witnesses:
Fred Gerlach
A. Adamick
Inventor:
E. W. Fowler
By Peirce & Fisher
Attorneys.
THE NORRIS PETERS CO., PHOTO-LITHO., WASHINGTON, D. C.

UNITED STATES PATENT OFFICE.

ELBERT W. FOWLER, OF CHICAGO, ILLINOIS.

BOLT-WORK FOR SAFES.

SPECIFICATION forming part of Letters Patent No. 526,181, dated September 18, 1894.

Application filed November 20, 1893. Serial No. 491,438. (No model.)

*To all whom it may concern:*

Be it known that I, ELBERT W. FOWLER, of Chicago, Cook county, Illinois, have invented certain new and useful Improvements in Bolt-Work for Vaults or Safes, of which the following is hereby declared to be a full, clear, and exact description, sufficient to enable others skilled in the art to make and use the same.
The invention relates to the doors of safes or vaults and in connection with the familiar pressure bar carried upon the outside of the door the improvement designs to provide an internal presser which draws the door to a snug seat and thus prevents the introduction of explosives into the crack between the door and its frame. The presser being internal is relieved from the tampering to which the outside pressure bar is exposed and is generally brought into or out of action through the medium of a power motor arranged within the safe or vault and released for its proper play by suitable trip under control for that purpose. Because of its protected location the presser acts to hold the door snugly against the jamb even though the outer pressure-bar may have been torn away. In preferred form the lock-bolts or opposite pairs thereof (one or more) carried by the door have assigned to them the added function of a presser and are organized in such fashion that in the interval between casting and retracting them to lock and unlock the door they are shifted *in situ* so as to compel the door to draw more certainly to or from its seat on the frame. The relation of the presser to the door and frame shows it to be necessarily a lock device but it can be organized quite distinctly from the ordinary bolt-work and in that view be independent in its action the same as the external pressure bar in familiar use.

The exact nature of the improvements, various details thereof and some of the structural forms applicable in practice will appear in the description following and the invention be pointed out by claims at the conclusion.

In the accompanying drawings which form a part of the specification like parts have like designation throughout.

Figure 2:
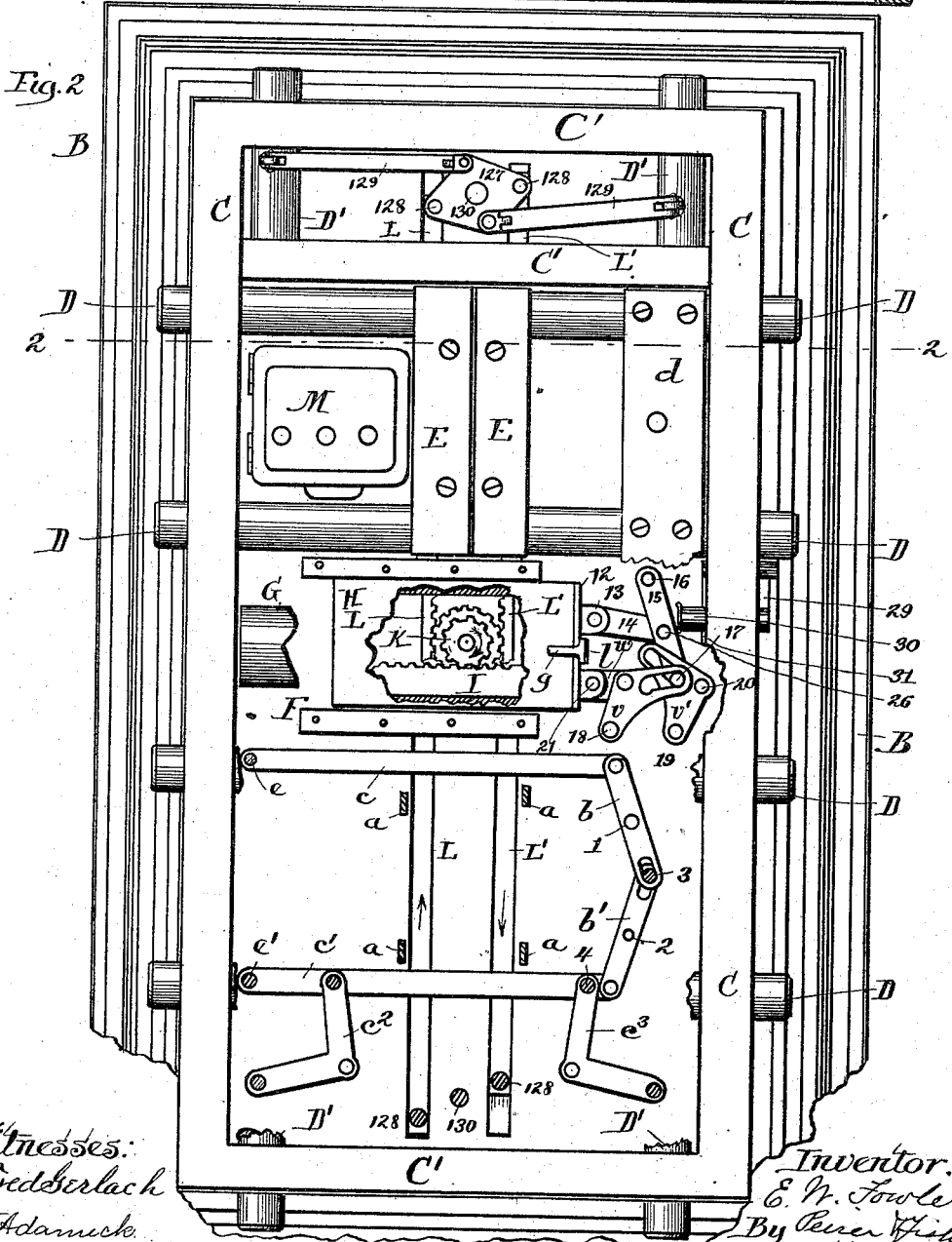
Figure 3:
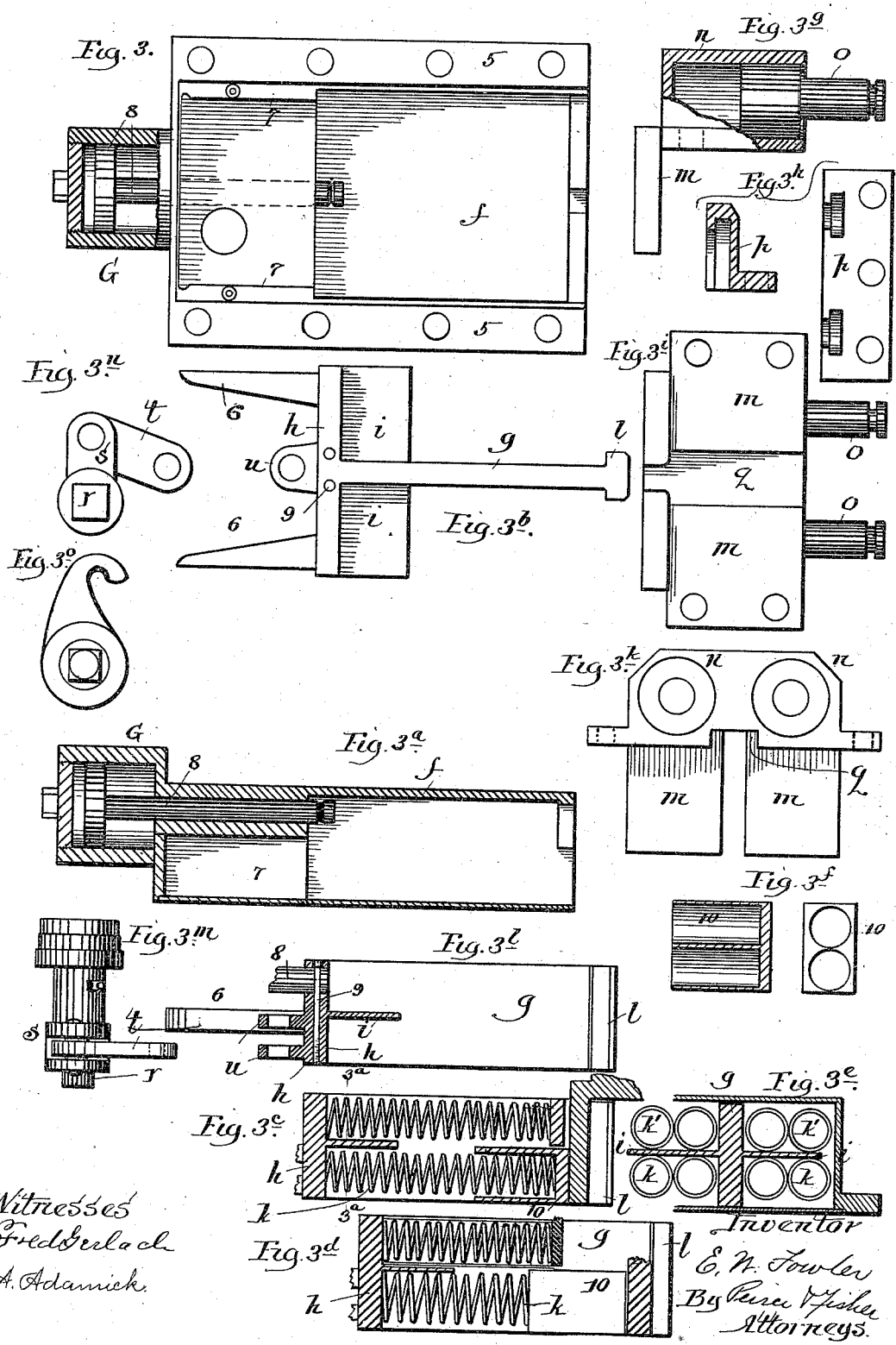
Figure 6:
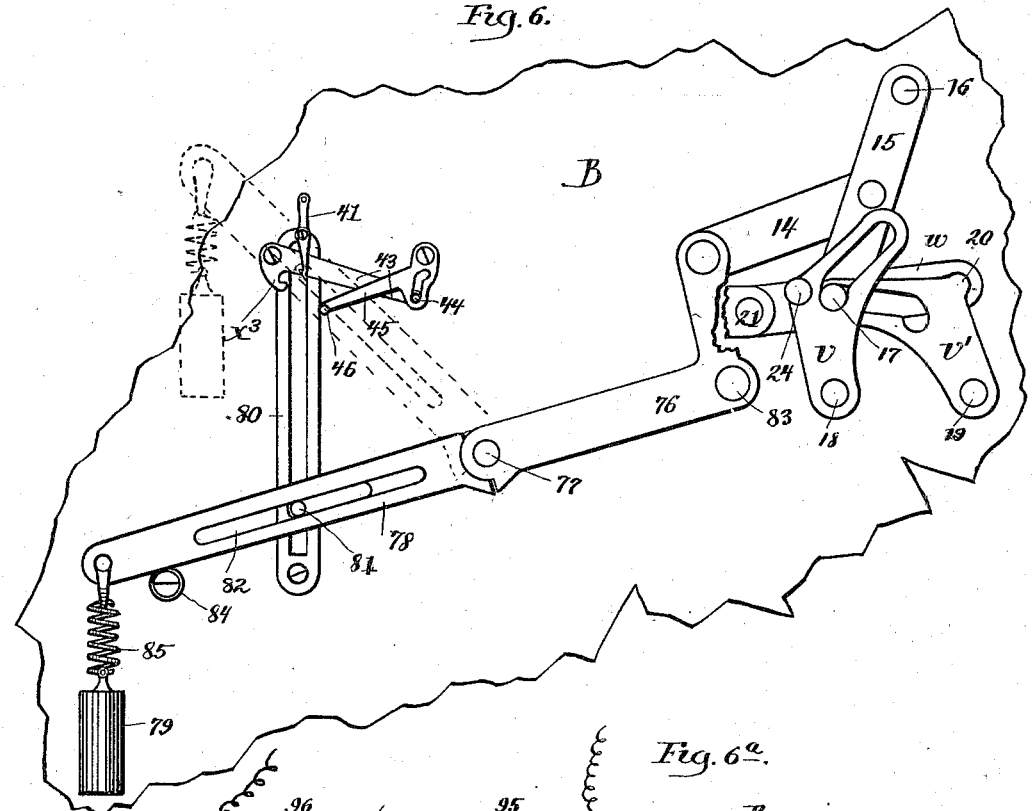
Figure 7:
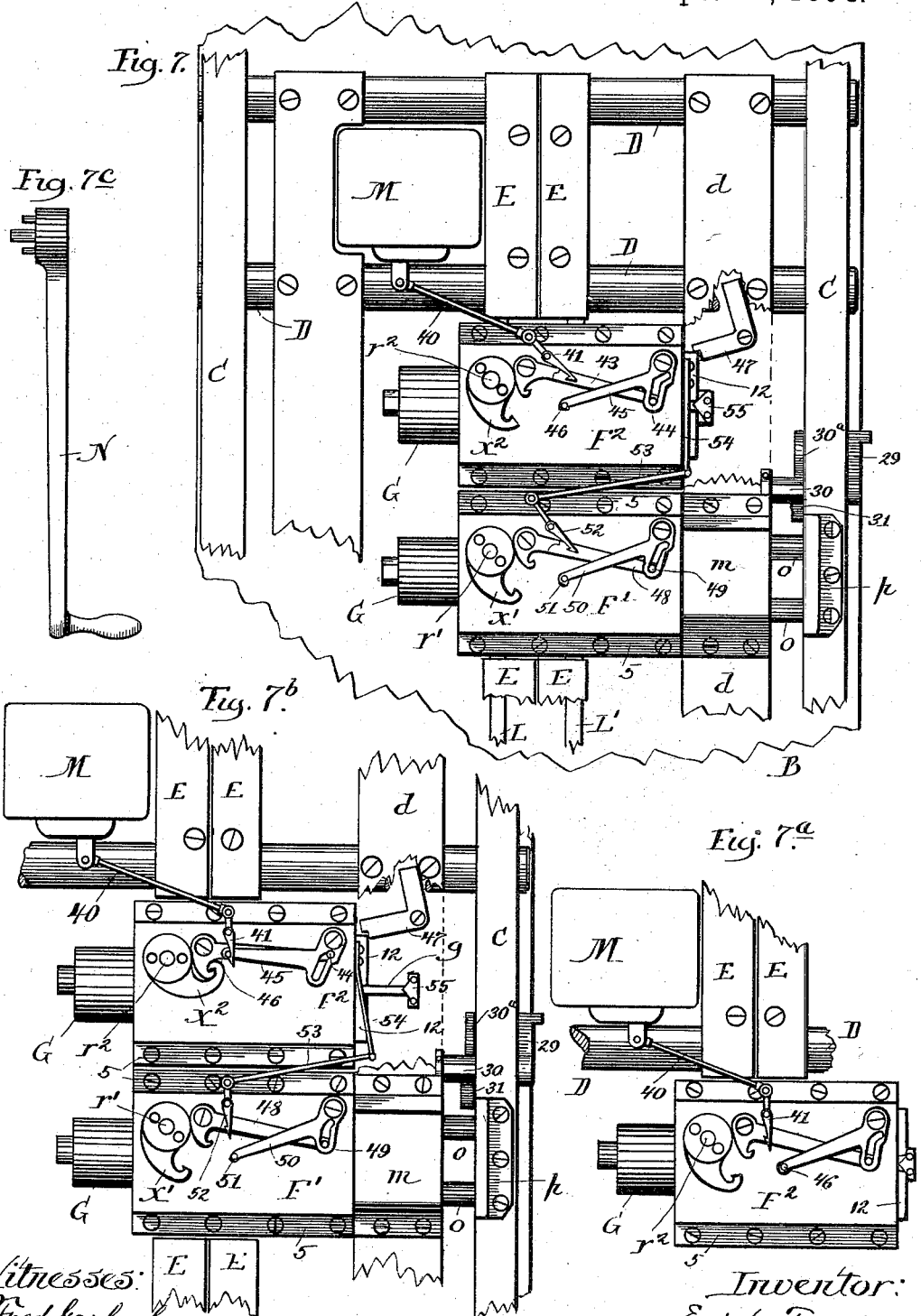
Figure 8:
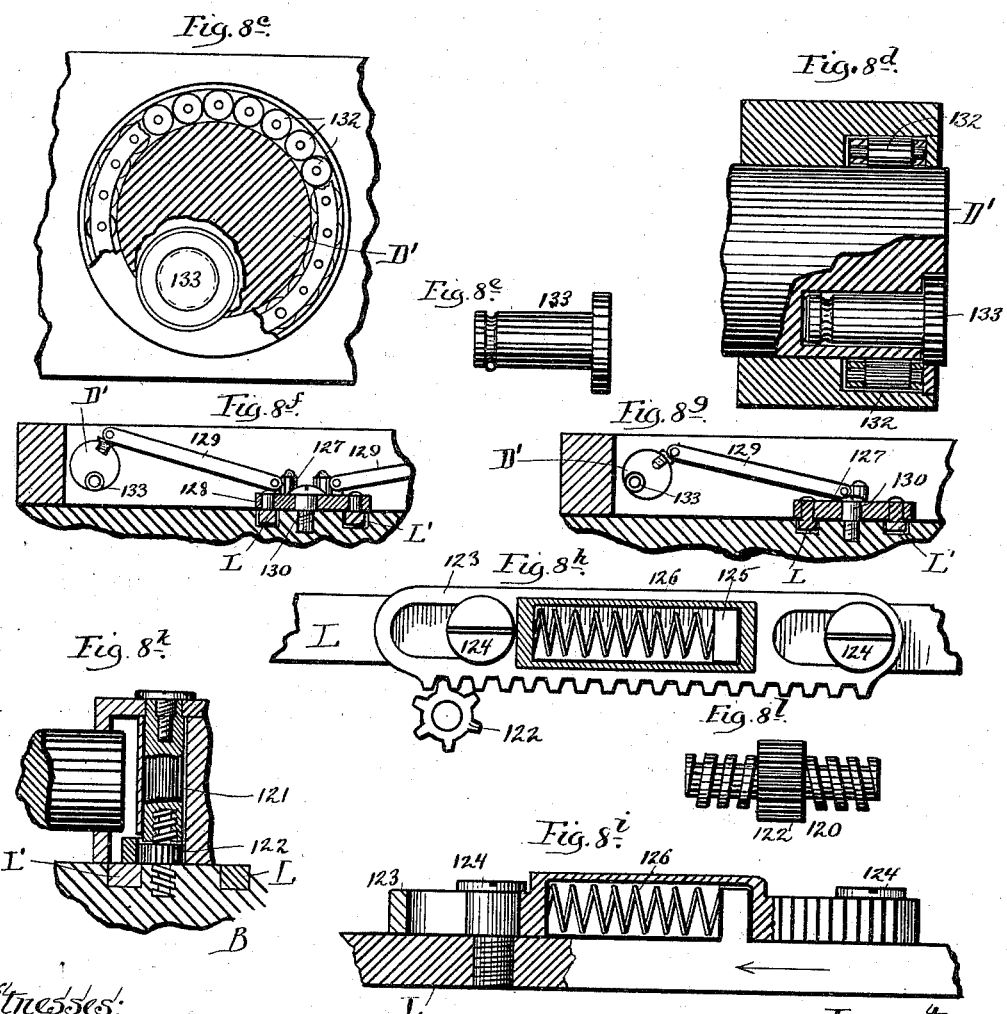
Figure 9:
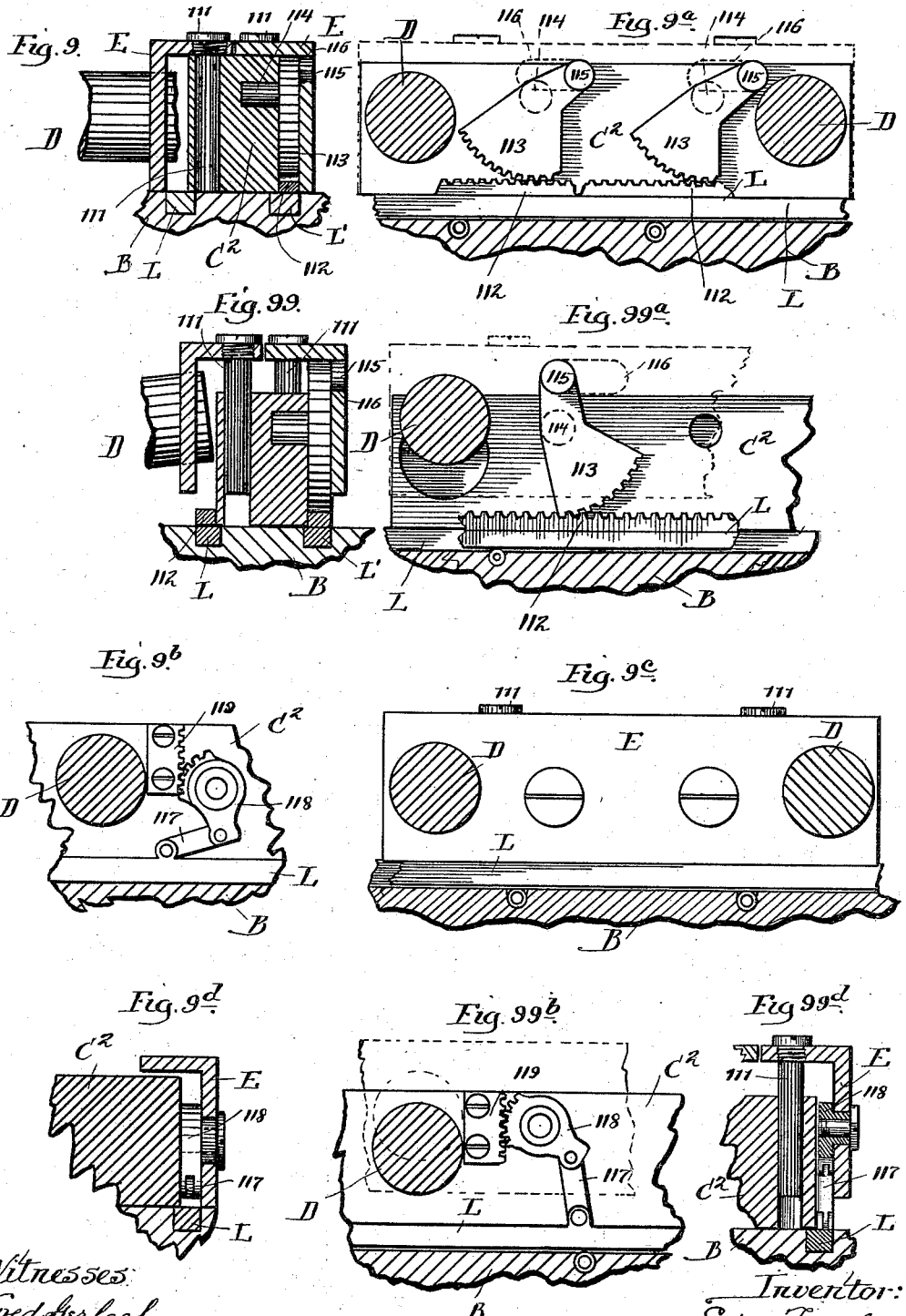

Figure 1, Sheet I, is a view in elevation of the back face of a door showing one form of the invention; Fig. 1ª, a cross-section view at line 1—1 of Fig. 1. Figs. 2 and 2ª, Sheet II, are like views with Figs. 1 and 1ª respectively but with the locking-bolts cast and in pinching position; Fig. 3, Sheet III, a reverse plan view of an inclosing case for a power motor; Fig. 3ª, longitudinal section view thereof; Fig. 3ᵇ, plan view of motor draw-bar detached; Fig. 3ᶜ, view in longitudinal section of draw-bar and springs relaxed; Fig. 3ᵈ, like view with retraction springs set; Fig. 3ᵉ, cross-section view at line 3ª of Fig. 3ᶜ; Fig. 3ᶠ, detail section and elevation of caps for casting springs; Fig. 3ᵍ, detail section of air-check on angle-plate interposed between the motor and carrying bar; Fig. 3ʰ, detail of clip-plate at bolt-frame to retain stem of piston rod (Fig. 3ᵍ); Fig. 3ⁱ, reverse plan view of angle-plate (Fig. 3ᵍ); Fig. 3ᵏ, back elevation view of said plate; Fig. 3ˡ, longitudinal section view of draw-bar; Fig. 3ᵐ, detail plan view of the setting shaft for the motor and its toggle link; Fig. 3ⁿ, detail elevation of same; Fig. 3º, detail under side elevation of set hook on shaft (Fig. 3ᵐ), face view being shown with connections on Sheet VII; Fig. 4, Sheet IV, plan view of one style of power motor; Fig. 4ª, like view showing the motor set; Fig. 4ᵇ, perspective view of one style of motor and its connections (Sheet III) reversed, *i. e.*, with base plate removed to expose interior; Fig. 4ᶜ, detail of setting lever for motor, Fig. 4; Fig. 4ᵈ, details of pinion-actuator for rack-bars of the bolt tilt-plates; Fig. 4ᵉ, detail of pitman-rack for pinion, Fig. 4ᵈ; Fig. 4ᶠ, a perspective view showing in reverse the shifter plate at the back, *i. e.*, at rear face of the motor case (Fig. 1) and parallel racks in relation thereto; Fig. 5, Sheet V, detail of the swinging driver to shift the bolt carrying-bar; Fig. 5ª, detail of link at swinging driver of motor; Fig. 5ᶜ, detail view of one of the dual cam-levers and its link for the pitman-rack; Figs. 5ᵈ, 55ᵈ and 555ᵈ, detail views to illustrate several positions of driver, left cam-lever and adjuncts during the bolt-casting movement; Figs. 5ᵉ, 55ᵉ and 555ᵉ, like views but with right cam-lever during pinching movement; Fig. 5ᶠ, perspective detail of carrying-bar in its relation to left cam-lever; Fig. 6, Sheet VI, conventional view of weight-motor and its connections; Fig. 6ª, like view of an electric motor; Figs. 7 and 7ᵇ, Sheet VII, elevation views of double motors respectively for casting and retracting and for pinching and unpinching the bolt-work when unset and again with casting motor set; Fig. 7$^a$, an intermediate stage for the casting motor and timer; Fig. 7$^c$, view of setting lever for the motors; Figs. 8$^c$ and 8$^d$, front and section views respectively, of bolt-frame, bolt, and inset-cam to effect the pinching of door to its frame; Fig. 8$^e$, detail view of cam-pincher; Figs. 8$^f$ and 8$^g$, detail views of mechanism to rotate the bolt for cam-pinching; Fig. 8$^h$, detail plan and Fig. 8$^i$, section view of cushion device for longitudinal rack-bars; Fig. 8$^k$, detail section of screw-shifter for bolt lift-plates; Fig. 8$^l$, detail view of the screw and its nuts; Figs. 9 and 99, Sheet IX, detail sections of tilt-plate lowered and raised; Figs. 9$^a$ and 99$^a$, side elevations of same showing tooth-sector connections of rack-bar, tilt-plate and bolt-frame; Figs. 9$^b$ and 99$^b$, detail side views of another form of tooth-sector and its connections; Figs. 9$^d$ and 99$^d$, cross-sections of same lowered and raised; Fig. 9$^e$, view in elevation thereof at the tilt-plate face; Fig. 10, Sheet X, front view of ordinary safe door with pressure-bar thereon; Fig. 10$^a$, details of pressure-bar cam-pins raised and lowered in their relation to the catch lugs on door-frame; Fig. 10$^b$, detail elevation of parallel link-motion for setting two motors simultaneously; Fig. 10$^c$, detail of latches and connections at double motors to compel orderly successive setting; Fig. 10$^d$, detail elevation of motor with double drivers and adjuncts to operate front and rear bolts simultaneously; Fig. 10$^e$, detail of modified expedient (Fig. 10$^e$) to compel orderly setting of double motors; Fig. 10$^f$, detail plan and Fig. 10$^g$, detail elevation of a stop to dog the motor at the carrying-bar until the door is shut; Figs. 10$^h$ and 10$^i$, details of stop shaft viewed in elevation at opposite ends.

In ordinary practice the door-frame A and the door B are provided as usual with tongue and groove seats at the jamb having the customary packing of felt or rubber between them. Upon the inner face of the door is secured the stout rectangular frame C which serves as usual to sustain the series of locking bolts D near their outer ends. Cross-pieces C' extend between the vertical members of the frame C at their upper (and lower) ends to afford seats for the inner terminals of the vertical bolts D'. The usual carrying-bar d (Figs. 1 and 2) is fastened to the set of horizontal bolts D at the free side of the door and compels the several bolts of the set to move in unison as well understood. At their inner ends the horizontal bolts D are seated within the tilt-plates E which have imparted thereto an up and down movement to and from the face of the door in manner presently detailed. When the plates E are down (Fig. 1$^a$), they rest at their lower edge upon rubber buffers $a$, seated upon the door. On being uplifted (Fig. 2$^a$) the tilt-plates E rise from the buffer seat $a$ and raise the inner ends of the locking-bolts D so that said bolts fulcrum upon the frame C and at their outer or free ends press against the door-frame A to pinch the door B snugly and stoutly against the jamb. On the lower half of the door (Figs. 1 and 2) dual levers $b$, $b'$ pivoting as at 1, 2 on the door are joined respectively to cross links $c$, $c'$ pivoted in turn as at $e$, $e'$ to the back bolts. The levers $b$, $b'$ have a slot joint connection by means of a through pin 3 secured to the carrying-bar $d$. When the carrying-bar shifts, it operates the system of levers referred to, acting thus upon the back-bolts and through bell crank lever $c^2$ upon the rear vertical bolts as well. The front vertical bolts are shifted through the bell crank $c^3$ which is in direct connection as at pin 4 with one of the front horizontal bolts which is secured to the carrying-bar $d$.

In the preferred practice of the invention a power motor F for casting and retracting the bolt series is mounted by its flanges 5 upon the back face of the door. Various types of motor can be used one convenient form being shown in detail at Sheet III and in reverse position, i. e., bottom-side up on Sheet IV, Fig. 4$^b$.

The motor-case $f$ (Sheet III) snugly receives the draw bar $g$ having cross-piece $h$ and midfin $i$ and against said cross-piece $h$ rest the back ends of the casting springs $k$ and retraction springs $k'$. The guides 6 at the rear of the draw bar bear upon the sides 7 of the motor-case $f$ and with the stem $g$ serve to steady the draw bar in its movement within the case. A cushion chamber G is carried at the back of the case and receives the piston and stem 8. The front terminal of the stem being seated in the cross-piece $h$ and fastened thereto by means of the groove and pin joint 9 as the draw bar moves back in the case the piston 8 and chamber G afford an air cushion to relieve the shock and save the parts from strain. The draw bar $g$ has at its front end a head $l$ which extends from the mid-with of the motor-case and is substantially of like depth with the case. The lower half of the front end of the case is cut away to allow for the play of the casting springs while the upper half affords a bearing for the front ends of the retraction springs and is slitted at its middle to permit the passage of the stem of draw bar $g$. The casting springs $k$ are furnished with cups 10 which cover their front ends (Figs. 3$^c$, 3$^d$, 3$^f$) to prevent disarrangement and bear stoutly against the rear face of an angle plate $m$ fastened to the carrying-bar $d$. The angle-plate $m$ (Fig. 3$^g$) has a chamber $n$ therein within which moves a piston $o$ secured by its grooved stem within the slotted seat of a bracket $p$ (Fig. 3$^h$) fastened to the bolt-frame C. The air chambers $n$ are two in number and serve in like fashion with the opposite air cushion to relieve the shock and strain under operation of the casting-springs. The angle-plate $m$ is slitted at its dependent flange (Fig. 3$^k$) so that the head $l$ of the draw-bar $g$ ranges in front of the flange and within a groove $q$ on the under face of plate $m$.

The organization of the parts is shown at Fig. 4$^b$ with the motor reversed and its base-plate $f'$ removed. Extending through the top of the case is a short shaft $r$ squared near its lower end to receive the crank $s$ which is joined by pivot link $t$ to the ears $u$ at the back of the cross-piece $h$ of the draw-bar. The details of the operating shaft $r$ and its connections appear in Figs. 3$^m$ and 3$^o$ and it will be seen that when the shaft is rotated forward it operates the draw-bar $g$ and thrusts the same forward also thus compressing the casting-springs $k$ between the cross-piece $h$ and the dependent flange of the angle-plate $m$ and compressing the retraction springs $k'$ between the cross-piece $h$ and the upper front stationary end of the motor-case. As will presently appear the angle-plate $m$ is temporarily held against movement by dogging the carrying-bar $d$ to which the plate is attached. When the dog is thrown out of play the casting-springs $k$ thrust forward the angle-plate $m$ and carrying-bar $d$ together with the lock-bolts attached thereto. The dependent flange of the angle-plate $m$ comes finally at rest in near contact with the back of the draw-bar head $l$ and there remains until the retraction springs $k'$ are brought into play. When this occurs the thrust of the said springs against the face of the cross-piece $h$ on the draw-bar moves the latter backward in the case and thereby moves the angle-plate $m$ against which the head $l$ of the draw-bar rests. Such reverse movement operates the carrying-bar $d$ and withdraws the bolts from locking position. The power motor thus described in detail acts simply to cast or retract the bolt-work and when employed by me is used for such purpose. By simple modification in its structure the same motor becomes appropriate to effect in addition the pinching and releasing of the internal presser although with heavy bolt-work especially a separate motor can be selected and used instead to operate the presser solely. When a single motor is chosen to perform both duties the proposed modifications can be carried out as follows: The motor-case and structure already described are practically retained, the fastening flanges 5 for the case being mounted upon blocks which thus raise the face of the case a slight distance from the face of the door. Within the free space thereby formed beneath the case snugly slides the shift-plate H (Fig. 4$^f$), having side-bars 11 on its bottom corresponding in height to the mounting blocks for the case and having an up-turned end 12 to bear ordinarily at rest against the front end of the motor-case. The head $l$ of the draw-bar projects as shown slightly beyond the plate-end 12 and when the parts are in position (Figs. 1 and 2) an ear 13 on the plate connects by pivot link 14 with a driver 15 pivoted as at 16 to the back face of the door. At its outer or free end the driver by its pin 17 is jointed to the slot cams of the dual reverse levers $v, v'$ pivoted respectively as at 18, 19 to the door-face. The right hand cam lever $v'$ is pivoted at 20 to a pitman $w$ jointed at its opposite end as at 21 to the eye of rack-link I which is seated to move as shown (Fig. 4$^f$), between slot 22 and guide 23 upon the under side of the shifter-plate H. The rack-link I at the motor thus becomes the direct mediary between said motor and the presser mechanism proper. As here shown (Figs. 1 and 2), the presser mechanism consists of a dual pinion K mounted upon the door, its smaller gear set engaging with the rack-link I while its larger gear set meshes at opposite points with the parallel rack-bars L, L′ which extend vertically nearly the full height of the door. Ordinarily the door is counter-sunk to receive the bars L, L′ and the larger rim of the pinion actuator K in position flush with the face of the door. The movements imparted in reverse to the rack-bars L, L′ through the medium of pinion K, link I, cam lever $v'$ and driver 15 from the motor F effect the pinching of the door against its frame and the release thereof in ordered relation to the throw of the bolt-work as will presently appear. The movements of the bolt-work are determined from left cam-lever $v$ by pin 24 thereon which projects into a slotted seat 25 (Fig 5$^c$) on the carrying-bar $d$. It will be seen that the pin 17 which projects from the driver 15 into the cam slots of the companion levers $v, v'$ is set upon the driver at a distance about double that of the pivot point 26 where the power of the motor is applied to the driver through the medium of the link 14. Hence whatever throw is imparted to the pivot 26 viewed as a point on driver 15 moving from fulcrum 16 as a center, a double distance will be traversed by the pin 17 during the same interval. The reverse cams on the companion levers $v, v'$ are arranged with reference to this peculiarity of movement. Each one participates but in succession in the play of the driver 15 and as the levers respectively operate to govern the shift of the bolt-work and the separate action of the presser mechanism *in situ* it follows that the play of the motor in either direction will effect in orderly fashion the successive play of the control levers $v, v'$.

On reference to Sheet V, Fig. 5$^d$ shows the position of the levers $v, v'$ and their connections when the bolt-work stands retracted in readiness to be cast. As the motor acts to throw the bolts forward the thrust of driver-pin 17 comes first upon the left lever $v$ at the shoulder of its cam-slot thus rocking the lever about its pivot 18 and through stud 24 pushing the carrying-bar $d$ to cast the bolt-work. The driver-pin 17 having traversed the straight-away part of the cam-slot in lever $v'$ (Fig. 55$^c$) acts upon it by encountering the cam shoulder and rocks the same upon its pivot 19 whereby the pitman $w$ shifts to throw the rack-link I and with it the presser mechanism. The driver 15 now stands at rest and because of the position of the toggle-joints $s$ and $t$, in the motor (Fig. $4^b$) holds the levers $v$, $v'$ locked and immovable against any effort to displace the bolt-work. When the retracting springs of the motor are brought into action to reverse the movements of the parts controlled thereby, the driver-pin 17 acts at the outset on the cam shoulder on the right lever $v'$ turning the same in reverse to release the presser mechanism (see Figs. $555^e$ and $55^e$). With this accomplished the further traverse of the driver-pin 17 causes it to encounter the abrupt cam shoulder on the left lever $v$, thereby throwing the same and with it the carrying-bar $d$ to retract the bolt-work so that the door may be opened. The several positions assumed by the dual levers $v$, $v'$ at successive stages of the forward throw are shown by Figs. $5^d$ and $5^e$, Figs. $55^d$ and $55^e$ and Figs. $555^d$ and $555^e$. The several positions which said levers assume in reverse, $i. e.$, during the backward throw are shown by the same figures viewed also in reverse, $i. e.$, Figs. $555^d$, $555^e$, &c.

To prevent any premature cast of the bolt-work before the door is closed it is convenient to temporarily dog the carrying-bar $d$, as for example by the simple expedient shown at Figs. $10^f$ and $10^g$, Sheet X. Through the bolt-frame C passes a rock shaft 27 sustained therein and by journal lug 28 from the face of the door B. At one end the shaft 27 carries a long arm 29 projecting as shown to encounter the door-frame as the door swings to. On the opposite side of the shaft 27 it carries a dog proper 30 and the stop 31 in piece therewith. The dog 30 rests against a ledge of the carrying-bar $d$ (Fig. $10^g$), to check the same against play until the arm 29 encounters the door-frame. When this occurs shaft 27 rocks slightly to lift the dog 30 away from the carrying-bar $d$ which is thus free to advance under the impelling action of the casting springs of the motor. A spring $30^a$ restores the dog 30 to its normal position when the bolts are retracted.

Another form of dogging mechanism is displayed at Figs. 4 and $4^a$ (Sheet IV) and consists of a trigger 32 pivoted as at 33 to the motor case and by its hook engaging a pin 34 projecting from the angle-plate $m$ on the carrying-bar $d$. A spring 35 holds the dog 32 in position with its arm resting against the axle 36 of a revolving drum which carries a trippin 37. A spring pawl 38 engages a notch on the drum and ordinarily holds the latter at rest. When pawl 38 is pushed aside by its thumb-piece 39 (see Fig. 4), the drum is released and proceeds to revolve through its impelling spring and control as in the familiar music box. This release action occurs just as the door is to be closed and when stud-pin 37 encounters the tail of the dog 32 it moves the latter about its pivot 33 releasing the trigger at stud 34 so that the carrying-bar $d$ can be cast by the power motor. Spring pawl 38 catches over its lug at the end of the revolution and arrests the further movement of the revolving drum.

As already indicated, various forms of power motor can be used to cast and retract the bolt-work and if an extra motor be assigned for the exclusive duty of operating the presser mechanism the two separate motors can be organized for orderly co-action as shown by Figs. 7 and $7^b$ (Sheet VII). The lower motor $F'$ there shown controls the bolt-work as usual while the upper motor $F^2$ serves to effect the pinching of the door against its frame. The structure of the lower motor $F'$ is like that already detailed (Fig. $4^b$) and the same is true for the upper motor $F^2$ except that said upper motor is furnished with a shifter-plate H (Fig. $4^f$) mounted as already detailed so as to slide beneath the motor-case; but the rack-link I (Figs. 1 and $4^e$) located as before in the guide-ways 22, 23 of the base-plate (Fig. $4^f$) is rigidly secured to said plate and actuates the presser mechanism. The throw of the bolt-work to and fro is solely accomplished by the lower motor $F'$ acting alone for that purpose through the medium of an angle-plate $m$, &c., already described (Figs. $3^g$, $3^h$, and $4^b$). It thus appears that the lower motor $F'$ operates exclusively to cast and retract the bolt-work while the upper motor $F^2$ acts separately in orderly fashion to shift the presser mechanism only. The orderly progress in the play of the two motors $F'$, $F^2$ can be simply effected as follows, (Sheet VII):—The timer M operates in familiar fashion through its link 40 upon the detent 41 pivoted to the front of the motor-case $F^2$. On bringing the timer in position for setting (Fig. $7^a$) the lever N is inserted as usual first into the operating socket of the hook shaft $r^2$ belonging to the upper motor $F^2$. By the throw of the setting lever N, the hook $x^2$ encounters lever 43 which rises with its pin 44 and ultimately lifts the lever 45 until stud 46 thereof snaps into position and is held by spring latch 41. The parts are now in the situation shown by Fig. $7^b$ with shaft hook $x^2$ securely retained by the companion hook on lever 45. The setting of the upper motor would ordinarily compel its casting springs to thrust the upturned end 12 of the shifter-plate H (Fig. $4^f$) forward but this is prevented by the dog 47 which is then in position to resist the movement of the shifter-plate. The play of the motor $F^2$ being thereby temporarily restrained it is easy for the operator to mount the wrench N in the socket of axle $r'$ of the lower motor $F'$ and bring its hook $x'$ into interlocking engagement with the companion hook on lever 48. As lever 48 and its pin 49 rise to position they lift the companion lever 50 until lug 51 thereon snaps into the detent of pivoted pawl 52. A link 53 joins the tail of said pawl to a spring arm 54 secured to the case of the upper motor $F^2$ in position to encounter a trip 55 carried on the head of the draw-bar $g$. The door is provided with a dog such as already described (Figs. $10^f$ and $10^i$) which engages the carrying-bar $d$ and serves thereby to resist the forward throw of the lower motor $F'$ exerted upon the carrying-bar. When the dog contacts with the door-frame in the act of closing it is tripped out of engagement with carrying-bar $d$ which is thereupon impelled by the lower motor $F'$ to cast the bolts into locking position. Near the end of its forward movement a pin upon the carrying-bar $d$ rocks the bell crank dog 47 about its pivot far enough to release the end 12 of the shifter-plate attached to the upper motor $F^2$. Under influence of the casting springs said shifter-plate thereupon moves forward until its upturned end 12 comes at rest in near position to the head of draw-bar $g$. The forward thrust of the shifter-plate brings the pinion actuator K for the pinching mechanism (Figs. 1 and $4^d$) into play through the movement of the rack-link I (Figs. $4^c$ and $5^b$) which, as already explained, in this form of double motor is attached to the shifter-plate H and moves with it. The bolts have been both cast and pinched *in situ* and will remain in such condition until the timer operates through its link 40 and detent pawl 41 to release pin 46 on lever 45 of the upper motor. When this occurs the hook $x^2$ withdraws from its engagement with the companion hook on lever 45 under influence of the retraction springs which latter exert their force upon the cross-piece of the draw-bar $g$ and throw the head of the draw-bar backward toward the motor-case. The draw-bar head being in contact with the upturned end 12 of the shifter-plate forces said plate backward also and through the medium of its rack releases the pinching mechanism as will presently appear. During this operation the trip 55 on the draw-bar head actuates the spring arm 54 which in turn releases the detent 52, thus disengaging the hook $x'$ on the lower motor $F'$. The disengagement of hook $x'$ allows the retraction springs in the lower moter to act and thereby to withdraw the carying-bar $d$ and its bolts from locking position.

It is desirable that the "pinch" motor shall be set in advance of the "bolt" motor and the mechanism just described provides for this since it is impossible (see Fig. 7) to bring the lower detent pawl 52 into locking position until the trip 55 on the draw-bar head of the upper motor has been thrown out of contact with the dependent spring arm 54; but such withdrawal of trip 55 will not ensue unless dog 47 bears against the upturned face 12 of the shifter-plate; all of which conditions, compel the operator to first attend to the setting of the upper motor in advance of the lower. A similar expedient to the same end consists in dispensing with the dependent spring arm 54 and link 53 using in lieu thereof the connection shown by Fig. $10^c$ (Sheet X). An intermediate lever 56 pivoted as at 57 to the motor case carries at its opposite ends the links 58, 59 which are pivoted to the detent pawls 41, 52 respectively. Fig. $10^c$ shows the parts in locking position with the timer set and connected to the heel of pawl 41 (Fig. $7^b$). The lower link 59 is furnished with a slot 60 to afford necessary play in bringing the detent pawl 52 into locking engagement with its lug 51. If said pawl were set in advance and effort were made thereafter to set the upper pawl 41, in the effort to do so the movement of intermediate lever 56 would unlatch the lower pawl 52 and necessarily compel the lower motor to be reset thereafter.

At Fig. $10^b$ (Sheet X), a parallel link motion is shown which enables both motors to be set in unison, said system consisting of double wrenches $N^2$, $N'$ mounted upon the toggle axles of the two motors and united by means of the cross-link 61 pivoted to the terminals of the wrenches and to hand-lever 62. A tie-bar 63 journals upon the motor axles and pivots as at 64 upon the same point with the hand-lever 62.

Still another expedient to insure the advance setting of the "pinch" motor is shown at Fig. $10^e$. The structure is practically the same as at Fig. $10^c$ except that the intermediate lever 56 carries a spring pawl 65 which engages with a ratchet 66 upon the under side of compound lever 50. If attempt be made to bring the intermediate lever 56 into vertical position, as in setting the detent latch for the lower or "bolt" motor, the pawl 65 on said lever resists the movement and thus compels the compound lever 45 to be raised and suspended at its lug 46 before the lower motor can be set.

In lieu of the interlocking hooks $x'$, $x^2$ at the ends of the motor shafts to engage with the system of compound levers just described, the separate motors can be furnished with a pin 67, Figs. 4, and $4^a$ (Sheet IV) projecting through a slotted case and carried by cross-piece $h$ of the draw-bar. A setting lever 68 inserted through an opening 69 in the lid of the motor-case bears against the back of the cross-piece $h$ and compels the same to push forward to compress the system of springs belonging to the motor. Pin 67 travels forward with the cross-piece and beneath the face of lever 70 until it arrives at the notch thereof and by contact with said notch draws the lever about its pivot 71 thus raising companion lever 72 through its pin and slot connection 73 until its lug 74 catches over the detent on spring pawl 75. In this situation the notch on lever 70 detains the projecting pin 67 and thereby holds the cross-piece $h$ of the draw-bar until spring pawl 75 is thrown out of action by the timer. The mechanism just detailed is open to objection because the motor springs exert their full stress upon the compound levers whereas in the toggle shaft form (Fig. $4^b$) the thrust is relieved in large part because the crank $s$ and its link $t$ when the springs are set stand nearly in alignment to resist the throw. Except for this objection the style of motor shown by Fig. 4 can be used to effect the shift of the bolt-work and insure its pinching action with advantage nearly as well as the other forms heretofore detailed.

The use of spring motors, although these are simple and effective is by no means essential. A weight motor such as shown by Fig. 6 (Sheet VI) can be substituted therefor by simply providing a bell crank lever 76, pivoted at one end to the link 14 which connects as usual at any suitable point with the driver 15 to impart the necessary movement to the dual cam levers $v, v'$. By knuckle joint 77 the lever 76 is pivoted to slotted extension 78 from which is suspended the weight 79. A slotted guide 80 affixed to the door affords suitable ways for a sliding block carrying a pin 81 to engage with the slot 82 in extension 78. The system of compound levers 43, 45 with detent pawl 41 and lug 46 to engage therewith are provided as usual and a hook $x^3$ on lever 43 serves to retain pin 81 when the extension 78 is properly lifted to position. This lifting and adjustment occurs just prior to the closing of the door and until the trip-dog on the door releases the carrying-bar the cam levers and their adjuncts together with the elbow lever 76 remain in place as shown in Fig. 6. When the dog unblocks the carrying-bar the weight 79 throws the extension 78 about pin 81 as the fulcrum compelling the long end of bell crank lever 76 to rise about its pivot 83 until arrested by and stopped at the angle joint 77. This movement of the bell crank lever 76 thrusts forward the link 14 and actuates the driver 15 which in turn brings the cam levers $v, v'$ into play and thereby effects the casting of the bolts and the "pinching" of the door.

When the timer releases pawl 41 the hook $x^3$ disengages from pin 81, and lever 77 with its extension 78 descend in unison about pivot 83 as a center. A rubber stop 84 and a spring connection 85 between weight 79 and extension 78 serve to check the force of descent. During the down traverse the link 14 has been shifted back, and through the medium of the driver 15 has effected a reverse thrust of the cam levers $v, v'$ with parts connected thereto, to effect the unpinching and retraction of the bolt-work.

Fig. $6^a$ illustrates an electric motor designed for like purpose. The driver 15 already described is connected by its link 14 with a radius pin 86 projecting from a gear-wheel 87 which is in mesh by pinion 88 with ratchet wheel 89. Said ratchet is actuated at proper intervals by the pawls 90, 91 set upon a pendulum 92 pivoted as at 93 to the face of the door. The pendulum 92 is furnished with opposite armatures 84 to confront the pole-terminals of magnets 95, 96 sensitized alternately on vibration of the pendulum 92 through the medium of the contact pieces 97, 98 which close the electric circuits. The pin 86 on gear-wheel 87 engages with the slotted arm 99 of a slide 100 having pivoted thereto as at 101, a slotted bar 102 which carries a block 103 with projecting pin thereon to traverse the slotted way in the guide 105. As shown by the drawings the parts are in unlocked position lifting the slotted bar 102, the block 103 adjusts itself in the slot, and pin 104 is finally caught by the hook $x^4$ which is sustained in turn through the compound levers 43, 45 and lug 46 from pawl 41. The lifting of the block 102 turns the same about its pin 101 and releases the pendulum 92 which thereupon swings upon its pivot 93 and closes the contact piece 98 to establish circuit in the electro-magnet 96. The magnet thereupon attracts the confronting armatures 94. Thus the pendulum 92 is caused to vibrate back and forth to drive the ratchet wheel 89 and through pinion 88 the gear-wheel 87 which proceeds to revolve thrusting the link 14 forward and with it shifting the driver 15 and dual levers $v, v'$ to effect the casting and pinching of the bolts. The slide 100 through its arm 99 participates in the forward movement of the link 14 and advances in turn the bar 102 until the spring catch 106 thereon comes into the path of the vibrating pendulum 92 and stops its movement. Before the movement of the pendulum is thus arrested the gear-wheel 87 describes a one-half revolution so that the link 14 and its connected parts are at the extreme forward thrust.

When the timer releases the hook $x^4$ from pin 104 the bar 102 drops down in its guide 105 until it rests against the buffer stop 107. On release of the bar 102 at its hook the pendulum 92 resumes its vibrations and thus compels the gear-wheel 87 to describe a one-half circuit thereby unpinching and withdrawing the bolt-work and retracting the slide 100 until at length the spring catch 106 again encounters the pendulum 92 and arrests its further play.

In the preferred form (Figs. 1 and 2) the presser mechanism has the two parallel bars L, L' extending lengthwise of the door and in opposite engagement with the pinion actuator K. Said pinion and bars are generally counter-sunk so as to come below the face of the door (see Fig. $1^a$) and are designed to operate the lock-bolts (two or more) in such fashion as to effect the pinching of the door against its frame. A convenient way to effect this is by employing the tilt-plates E (Figs. 1 and 2) which receive the rear ends of confronting lock-bolts. On reference to Sheet IX it will be seen that the rack-bars L, L' are sunk to the face of the door and extend along the same in position below the tilt-plates E. The plates E receive the ends of the bolts D and being bent at right angles rest as shown against the face of the door B and upon the outer face of a block $C^2$ secured rigidly to the door. Guide pins 111 carried by the tilt-plates E, rise with and serve to hold them in position on the blocks C². The bars L, L' carry racks 112 (Fig. 9ᵃ) which engage with the sectors 113 pivoted as at 114 to the block C². The pin 115 extends from the sector 113 through a slot 116 in the tilt-plate. When the bars L or L' are moved in one direction the sectors turn about their pivots 114 to lift the tilt-plates E and thereby raise the inner ends of the lock-bolts D. Since said bolts have a slight play in the bolt frame C, the latter serves as a fulcrum and thus allows the front ends of the bolts to bear stoutly against the door-frame whereby the door is thrust snugly to its seat. Another form of rack and sector connection between the tilt-plates and the reciprocating bars L, L' is shown by Figs. 9ᵇ and 99ᵇ. The bars L are joined by link 117 to a disk 118 which pivots upon a tilt-plate E and by its sector teeth engages with a rack-bar 119 fastened to the fixed-block C². As appears from the drawings when the bar L is moved from the position shown by Fig. 9ᵇ to the position shown by Fig. 99ᵇ, it turns the disk 118 and raises the tilt-plate E free from its position of rest and thereby causes the locking bolts to pinch the door. According to another plan (Figs. 8ᵏ and 8ˡ), a right and left screw-bolt 120 seated at one end in the door B is threaded at its opposite end to a sleeve 121 fastened to the angle-plate E. A pinion 122 carried by the screw engages with one of the rack-bars L and as the latter reciprocates the screw is turned back and forth to raise or lower the tilt-plate E as desired.

Owing to modifications in structure it is difficult to insure the exact movement in unison of all the bolts which determine the pinching effect. Accordingly provision is made at separate tilt-plates to compensate for these irregularities and to such end (see Figs. 8ʰ and 8ⁱ) the connection between the reciprocating-bar L and the pinion 122 or the like is effected through the medium of a "cushion" rack. This consists of a toothed plate 123 secured at its slots by screws 124 to the bar L which latter is furnished with a stud 125 projecting within a guide slot of plate 123. A spring 126 rests against lug 125 and at its opposite end against the plate 123 and constitutes a yielding or "cushion" connection between the bar and its rack-plate. If now pinion 122 or its equivalent is arrested in its movement the bar L may still complete its throw since the spring 126 will compress and permit the lug 125 to advance in the slot until its traverse is ended. In the arrangement shown by Figs. 1 and 2 the vertical bolts are cast in the usual manner by bell-cranks and pinched *in situ* by the reciprocating bars L, L'. To this end a vibrating disk 127 pivoted to the door is connected as at 128 (see also Figs. 8ᶠ and 8ᵍ) to the reciprocating bars L, L' and at opposite corners by pivot links 129 to the vertical bolts D'. The movement of the plate 127 about its center pin 130 compels the bolts D' to rotate slightly which are connected to the casting mechanism in suitable manner to permit such movement.

An advantage of the slight rotary movement of the lock-bolts D' will appear on examination of the drawings (Figs. 8ᶜ and 8ᵈ). The bolt-frame C is furnished with a series of anti-friction rollers 132 which snugly inclose the body of the bolt D'. Said bolt is bored out at one part of its circuit to receive a cam tumbler 133 which is pinned therein but has its face rim projecting eccentrically with reference to the circuit of the bolt D'. When rotation of the bolt occurs, after the same is in locked position in the frame, it is plain that the tumbler 133 acts as a cam and through the connected parts tends to draw the door to a tight "pinching" seat upon its frame.

A simple means for effecting the simultaneous shift of opposite sets of lock-bolts is shown by Fig. 10ᵈ (Sheet X). The carrying-bars d, d' are in connection with opposite systems of cam levers v, v', the front set of which are joined as already described to the driver 15 and by link 14 to the ear on the upturned end of the shifter-plate. A pitman w joins the right lever v' to a rack-link I' and a pin 24 serves to actuate the carrier-bar d as heretofore described. At the rear side of the motor-case a corresponding system of parts but in reverse, is mounted in position and receives its action through the sectors 134 which engage with the rack-links I', I². A pitman 140 secured by a lug to the shifter-plate moves its driver 150 in reverse to the movement effected at the front by the link 14 on the driver 15. Hence the combined system of parts moves simultaneously but the front cam-levers and adjuncts describe their movement exactly in reverse of the back set which means that front and rear bolts are cast or retracted in unison but in opposite directions.

It is quite manifest from the variety of types set forth by the preceding specifications and other changes which will occur to those skilled in the art that the present invention is not limited to the mere details such as are here shown to be efficient in practicing the invention but that the improvements embrace all such modifications therefrom as still embody the essential spirit and general mode of operation distinctive of the advance.

What I claim is—

1. The combination with the door and door-frame of the internal presser and internal power mechanism to actuate the presser automatically whereby the door is drawn to and released from a snug seat on the frame, substantially as described.

2. The combination with a door-frame and with a door having bolts thereon and suitable means to cast and retract said bolts, of an internal presser mechanism and internal automatic means to actuate said presser mechanism while said bolts are held in locked position, substantially as described.

3. The combination with the door-frame and with the door having lock-bolts thereon and suitable means to cast and retract them of supplemental internal presser mechanism and internal automatic power motor therefor to shift said bolts *in situ* distinct from their locking traverse whereby the door is drawn to or released from a snug seat on the frame, substantially as described.

4. The combination with the door-frame and with the door having bolts thereon and suitable means to cast and retract said bolts of an internal presser and internal automatic mechanism to actuate the presser in the interval between casting and retracting the lock-bolts whereby the door is drawn to and released from its snug seat on the frame, substantially as described.

5. The combination with the door-frame and with the door having bolt-work and suitable means to cast and retract said bolt-work of supplemental presser mechanism and power motor therefor to automatically tilt the locking-bolts whereby the door is drawn to or released from a snug seat on its frame, substantially as described.

6. The combination with the door-frame and door, and the bolt-frame secured thereto, of the several bolts united by carrying bar common to said bolts and sustained by the bolt-frame, and internal automatic power mechanism to tilt the bolts at the frame after being cast whereby the door is pressed to its seat, substantially as described.

7. The combination with the door-frame and with the door having bolt-work and frame therefor and suitable means to cast and retract said bolt-work of supplemental presser mechanism and a power motor therefor to automatically shift said bolts *in situ* distinct from their locking traverse and a timer having trip connection with said motor to release the same and thereby reverse the presser mechanism, substantially as described.

8. The combination with the bolt-work and its frame, of the mechanism to cast and retract said bolt-work, the supplemental presser mechanism to shift the locking-bolts *in situ*, a power motor common to both of said mechanisms and in ordered connection with each and a timer having trip connector with said motor to release the same for action, substantially as described.

9. The combination with the bolt-work and its carrying-bar and with the supplemental presser mechanism to shift the locking-bolts *in situ*, of the power motor, the driver actuated therefrom, and the reverse levers in cam unison with said driver and with each other and joined respectively to said carrying bar and supplemental presser mechanism, substantially as described.

10. The combination with the power motor and with the driver actuated thereby of the supplemental presser mechanism to shift the locking-bolts *in situ* and the cam-lever intermediate said driver and the presser mechanism to move the latter by the driver, substantially as described.

11. The combination with the bolts and their frame, of the tilt-plates to receive the bolt ends, the companion rack-bars in suitable connection with said tilt-plates to shift them, the pinion meshing with said rack-bars and the power motor communicating with said pinion to move the same, substantially as described.

12. In internal presser mechanism for shifting *in situ* the lock-bolts of a safe or vault, the combination with the power motor of longitudinally moving companion bars suitably connected to opposite lock-bolts, an actuator common to said bars and reversely shifting them, said actuator being in driven relation to the motor, and a timer to automatically release said motor, substantially as described.

13. In internal presser mechanism for shifting *in situ* the lock-bolts of a safe or vault the combination with the bolts and their frame, of the tilt plate to carry the inner ends of the bolts, the longitudinally moving rack-bar and the sector-rack shifter suitably sustained intermediate said bar and tilt-plate and co-acting therewith to raise or lower the plate, substantially as described.

14. The combination with the bolt-work and frame, of the internal presser mechanism to shift the bolts *in situ*, comprising a power motor, a movable bar actuated therefrom and a "cushion rack" interposed between said bar and the shifter for the lock-bolt or bolts, substantially as described.

ELBERT W. FOWLER.

Witnesses:
ALBERTA ADAMICK,
FRED GERLACH.